United States Patent [19]

Hashimoto et al.

[11] 3,737,045

[45] June 5, 1973

[54] MEMBRANE FOR USE IN DIALYSIS AND ULTRAFILTRATION AND THE PRODUCTION OF SUCH MEMBER

[75] Inventors: Koichi Hashimoto, Tokyo; Hideko Kishida, Kashihara, both of Japan

[73] Assignee: Uivac Corporation, Chigasaki-shi, Kanagawa-ken, Japan

[22] Filed: July 8, 1970

[21] Appl. No.: 53,221

[30] Foreign Application Priority Data

Dec. 20, 1969 Japan..............................44/102118

[52] U.S. Cl. .....................210/490, 210/500, 264/49
[51] Int. Cl............................B01d 31/00, B01d 13/00
[58] Field of Search ....................264/49; 210/22, 23, 210/321, 500, 507, 490

[56] References Cited

UNITED STATES PATENTS

| | | | |
|---|---|---|---|
| 3,546,142 | 12/1970 | Michaels et al. | 210/500 X |
| 3,276,598 | 10/1966 | Michaels et al. | 210/500 |
| 3,450,631 | 6/1969 | Bloch et al. | 210/22 |
| 3,467,604 | 9/1969 | Michaels | 260/2.5 |
| 3,556,305 | 1/1971 | Shorr | 210/490 |
| 3,526,588 | 9/1970 | Michaels et al. | 210/23 |
| 2,355,822 | 8/1944 | Rugeley | 210/490 |
| 3,615,024 | 10/1971 | Michaels | 210/500 X |

*Primary Examiner*—Frank A. Spear, Jr.
*Attorney*—Ely, Golrick & Flynn

[57] ABSTRACT

This invention relates to a membrane suitable for use in dialysis processes and ultrafiltration processes to separate, concentrate or purify a substance of a molecular weight of 500 to 20,000, heretofore difficult to be treated by the various known types of dialysis membranes or ultrafiltration membranes. The membrane of the invention is characterized by its higher water flow rate and by the anisotropy of its structure made of an ionically cross-linked polymer of a polycation with a polyanion; the structure comprising a continuous and dense microporous top surface layer with an estimated averate pore diameter of about 10 to 120 angstroms and a lower, integral microporous reinforcing layer containing micropores of larger pore diameters, said membrane being supported by a porous layer of a polyolefin or polyamide. The membrane may be produced by applying to a porous supporting sheet a thin liquid film of an aqueous-organic solution containing both a polycation and a polyanion together with an inorganic sodium or calcium salt, then treating the film so as to increase the dielectric constant value in its top surface, washing the film in a water bath under controlled conditions and repeating operations of subsequent rinsing and drying the film.

27 Claims, 1 Drawing Figure

(Approx. 5600x)   1μ ⊢⊣

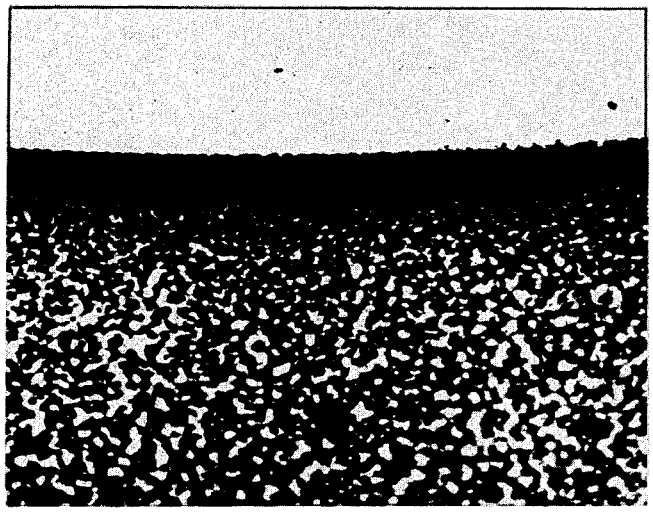
(Approx. 5600x)  1μ
INVENTORS
KOICHI HASHIMOTO &
HIDEKO KISHIDA
BY
ATTY'S.

MEMBRANE FOR USE IN DIALYSIS AND ULTRAFILTRATION AND THE PRODUCTION OF SUCH MEMBER

This invention relates to a new type of membrane for use in dialysis and ultrafiltration processes and by means of which a solution containing a substance having a molecular weight in a range of about 500 to 20,000 may be dialysed or ultrafiltered to effect an efficient and rapid separation, concentration or purification of said substance by known usual processes of dialysis or ultrafiltration. The present invention further relates to the production of such membrane from a solution containing oppositely charged polyelectrolytes dissolved in an aqueous organic solvent system of a controlled composition containing an inorganic salt.

The bodies of known types of ultrafiltration membranes have usually contained micro-pores the attainable minimum diameter of which in the prior art amounts only to about 20 m$\mu$, namely 200A. Now a molecule having a molecular weight on the order of 1,000,000 shows a diameter of approximately 200A., assuming that it is of a substantially spherical configuration. Consequently, it is not possible to utilize the known membranes for ultrafiltering a solution containing substances of molecular weights of less than 1,000,000, since such substances can freely pass through such micro-pores.

It is also known that cellophane membranes and collodion membranes hitherto available as dialysis membranes can only be used to effect the dialysis of a solution containing a substance having a molecular weight in a range of a few thousands to a few tens of thousands, for it has not been possible to control and pre-determine the diameter range of the micro-pores in the course of manufacture. Accordingly it has been necessary to subject these membranes as produced to a series of tests in order to determine the range of molecular weights of substances which may effectively be dialysed therewith. Besides, the known cellophane dialysis membranes have usually shown a low rate of permeation for water and hence have been less efficient in practice.

Moreover, where a cellulose acetate membrane is used for reverse osmosis, the substances which may be separated, concentrated or purified have been limited to those having low molecular weights, such as sodium chloride. With the known cellulose acetate reverse osmosis membranes, there are similar problems of infeasibility of controlling and predetermining pore diameters during manufacture, and necessity of testing, as above described. Also the known cellulose acetate membrane further disadvantageously usually exhibits a very much lower rate of water diffusion or permeation than the ordinary cellophane dialysis membranes. Besides, the reverse osmosis is technically inconvenient in that it essentially requires an application of an extremely high pressure on the one side of the membrane in order to overcome the osmotic pressure.

It has been proposed that, as the dialysis membrane, there be used a solid film of an ionically cross-linked polymeric reaction product, formed by contacting an aqueous solution containing a suitable concentration of a polyelectrolyte having polymeric anionic groups, (such as a polymer of sodium styrene sulfonate) with an aqueous solution containing a suitable concentration of a polyelectrolyte having polymeric cationic groups (such as a polymer or vinylbenzyl trimethyl ammonium chloride) within the body or on the surface of a porous support sheet, so that the polyelectrolytes react and ionically cross-link at the interface where the solutions come into contact with each other, whereby a solid film of said ionically cross linked polymeric reaction product is deposited at said interface (see U.S. Pat. No. 3,276,598). Although this known type of supported dialysis membrane has a high permeability toward simple substances of lower molecular weight such as sodium chloride, it has practically no permeability toward higher molecular weight compounds. Accordingly, this last-mentioned membrane is not suitable for dialysis of a solution containing a first substance having a molecular weight in a range of 500 to 20,000 together with another compound or compounds having molecular weight(s) near to or within the range of 500 to 20,000, for the purpose of separating, concentrating or purifying the first substance free from said other compound(s). Besides, it is not feasible to control and predetermine the diameter of the micro-pores present in the polymeric film of this kind of dialysis membrane in the course of manufacture.

An object of the present invention is to provide a new type of membrane for use in the ultrafiltration and dialysis processes which is not only capable of exhibiting a water permeation rate of about 10 to 1,000 times higher than those of the prior available ultrafiltration, dialysis and reverse osmosis membranes, but which also is capable of separating, concentrating or purifying a substance having a molecular weight in a range on the order of 500 to 20,000. Another object is provision of the described membrane wherein a top layer contains active micro-pores of relatively uniform diameter and an average diameter adjustable in a range of about 10 to 120A. Another object of the present invention is to provide a new type of membrane which may be so manufactured that the molecular weight of substances to be treated therewith may be optionally pre-determined and controlled during membrane manufacture. A further object is to provide a highly reproducible process for the production of a membrane exhibiting the above-mentioned favorable properties when used as an ultrafiltration or dialysis membrane.

It is known that when an aqueous solution of an acidic or anionic polyelectrolyte is merely mixed with an aqueous solution of a basic or cationic polyelectrolyte, the cationically and anionically dissociated groups in both the dissolved polyelectrolytes undergo the ionic interaction and linkage, so that both polyelectrolytes immediately combine with each other and can precipitate in the form of clumps. We, the inventors, have now found that a solvent system, prepared by dissolving at least one of sodium bromide, sodium iodide, calcium chloride, calcium bromide and calcium nitrate at a concentration of 10 to 35 percent by weight (based on the weight of the resulting solvent system) into a mixture of acetone and water or a mixture of dioxane and water (at a mixing ratio such as to give a dielectric constant value of 50 to 78 as determined at 20°C.), is able to dissolve and contain simultaneously, either in a salt form or in the free state, both a water-soluble anionic polyelectrolyte carrying sulfonic acid groups and also a water-soluble cationic polyelectrolyte carrying quaternary ammonium groups or pyridinium groups, while permitting said polyelectrolytes to remain dissolved in said solvent system in the form of a solution (more exactly speaking, in the sol solution state) without bringing about the coprecipitation which otherwise would take place by ionic interaction of these oppositely charged polyelectrolytes.

We have further discovered very interesting behavior displayed by such a solution of the oppositely charged polyelectrolytes which has been prepared by dissolving in the above-mentioned solvent system, to a total content of 2–8 percent by weight based on the quantity of the solvent system, a sulfonic acid group-carrying polyelectrolyte, or its salt, having a molecular weight of at least 50,000 and containing a sufficient number of the sulfonic acid groups to give a pH of 2 or less when said polyelectrolyte, in the form of the free acid, is dissolved in water to a concentration of about 0.6–5.4 percent by weight, as well as a quaternary ammonium group-carrying or pyridinium group-carrying polyelectrolyte or its salt exhibiting a molecular weight of at least 50,000 and containing a sufficient number of the quaternary ammonium groups or pyridinium groups to give a pH of 10 or more when said quaternary ammonium group- or pyridinium group-carrying polyelectrolyte, in the form of the free base, is dissolved in water to a concentration of about 0.6–5.4 percent by weight. Thus, we have found that when the so prepared solution is spread or cast into a thin liquid film at a constant temperature by application on a suitable support and then the value of the dielectric constant of the solution in the top surface layer of the thin liquid layer is increased by a suitable means, the top surface layer can be gelled; and that when the liquid film with the gelled surface layer is subsequently immersed in a bath of water, whereby the existing inorganic electrolytes and organic solvent are removed from the whole film into the water bath, a firmly bonded three-dimensional network of the ionically cross-linked polymer is formed within the body of the film, giving an anisotropic structure comprising a dense top layer and a coarse lower layer. When a cross-section across the solidified film is examined under an electron microscope, it has been observed that the top surface layer of the solid film has an electro-microscopically continuous and dense structure, whereas the lower layer has a micro-porous but rather sponge-like structure. In addition, it has been found that this continuous, top surface layer exhibits a sieving ability in allowing selectively substances of smaller molecular weights than a certain molecular weight to permeate therethrough but preventing substances of larger molecular weights from passing therethrough.

It also has been found that by choosing suitably the natures, molecular weights and concentrations of the polyelectrolytes used, the natures and numbers of the ionically dissociable groups of the polyelectrolytes, the nature and concentrations of the inorganic salt used etc., as well as the ratio of the organic solvent to water, and by selecting appropriately the process conditions, especially for gelation and water-immersion during the formation of the gelled and solidified film of the cross-linked polyelectrolyte polymer, the continuous, top surface layer may be produced with a very finely microporous structure which 1. exhibits a considerably higher water-permeation rate,
2. may be estimated to contain micro-pores of uniform size and of a controlled average pore diameter in a range of about 10 to 120A., and
3. is useful to separate, concentrate or purify a substance having a molecular weight in a range on the order of 500 to 20,000 by the dialysis or ultrafiltration processes.

The present invention is based on these aforementioned discoveries.

According to a first aspect of the present invention, therefore, there is provided a membrane adapted to be used in the ultrafiltration and dialysis processes, characterized as comprising:

a. a diffusive and continuous top surface layer, on the order of $1\mu$ in thickness, formed of a polymer produced by ionically cross-linking, at a ratio of equivalents of from 2:1 to 1:2, a water-soluble, acidic polyelectrolyte or a salt thereof, with a water-soluble basic polyelectrolyte or a salt thereof; the polyelectrolytes each having a molecular weight of 50,000–700,000; said acid polyelectrolyte containing a sufficient number, e.g., of sulfonic acid groups, to give a pH of up to 2 where said acidic polyelectrolyte is dissolved in the form of its free acid at a concentration of 0.6–5.4 percent by weight in water, and said basic polyelectrolyte containing a sufficient number of quaternary ammonium groups or pyridinium groups to give a pH of at least 10 where said basic polyelectrolyte is dissolved in the form of its free base at a concentration of 0.6–5.4 percent by weight in water; said top surface layer showing a dense and continuous structure as observed under an electron microscope at 5,600× magnification;

b. a reinforcing intermediate layer formed of the same ionically cross-linked polymer as, and integral with, said continuous top surface layer, and exhibiting a micro-porous but rather sponge-like structure as observed under the electron microscope at 5,600× magnification; and c. a porous support to which is tightly adhering the material of the intermediate layer; the support being formed of a polymer selected from polypropylenes and polyamides and exhibiting a porous structure containing pores of an average pore diameter of up to $10\mu$ but showing a water-flow rate of higher than 0.5 ml./cm²/min. as determined with water at 20°C. and at a pressure difference of 760mm Hg.

According to a second aspect of the present invention, for the production of such a membrane as defined above, there is further provided a process characterized as comprising:

i. preparing a solvent system by dissolving at least one of sodium bromide, sodium iodide, calcium chloride, calcium bromide and calcium nitrate, to a concentration of 10–35 percent by weight of the weight of the resulting solvent system, into a mixture of acetone and water or into a mixture of dioxane and water mixed together at such a ratio as to give a dielectric constant value of from 50 to 78 when determined at 20°C;

ii. dissolving into said solvent system, to a total concentration of 2–8 percent by weight based on the quantity of the solvent system, at a ratio of 2:1 to 1:2 by equivalents, a water-soluble acidic polyelectrolyte (or a salt thereof) and a water-soluble basic polyelectrolyte (or a salt thereof), said polyelectrolytes (and salts) being such as described in the immediately preceding paragraph;

iii. spreading the resulting solution or sol solution of the polyelectrolytes as a thin and uniform liquid film onto a support sheet made of a polypropylene or polyamide as characterized in the preceding paragraph;

iv. treating the thin liquid film at a temperature of from 10° to 50°C. so as to increase the dielectric constant value of the solvent system in the top surface layer of said thin liquid film;

v. continuing this treatment for a period of 5-120 minutes to bring about gelation in the liquid film;

vi. immersing the gelled liquid film together with the support sheet in a bath of water at a temperature of from 10° to 50°C. for a period of 5 to 60 minutes to remove at least parts of the inorganic salt and the acetone or dioxane from the gelled film;

vii. withdrawing the solidified film together with the support from the bath;

viii. drying the assembly or composite of the film and support at a temperature of 50° to 70°C. for a period of 3 to 30 minutes;

ix. then rinsing said composite with water at 10° to 50°C. for a period of 5 to 60 minutes; and x. subsequently repeating the cycle of the above drying and rinsing operations until the solidified film on the support is completely free from inorganic salts and the organic solvent, namely acetone or dioxane.

By the above-used description or characterization "capable of separating, concentrating or purifying a substance having a molecular weight in a range of the order of 500 to 20,000," it is meant that when the membrane is used in a known manner to ultrafilter or dialyse a solution containing a desired substance together with any other compound(s) having molecular weight(s) lower than, or at times higher than, that of the desired substance, said membrane is able to separate, concentrate or purify the desired substance, free from the other compound(s) of the lower molecular weight(s) by permitting all or substantially all of the molecules of said other compound(s) of the lower molecular weight(s) and some molecules of the solvent to pass through the membrane to the filtrate side or the liquid side external to the membrane, while preventing all or substantially all of the molecules of said desired substance together with any such other compound of the higher molecular weight from passing to the filtrate side or external liquid side. Conversely that characterization may also mean that, when the membrane is used to ultrafilter a solution containing a desired substance together with any other compound(s) having molecular weight(s) higher than, and occasionally also lower than, that of the desired substance, said membrane is able to separate, concentrate or purify the desired substance free from the other compound(s) of the higher molecular weight(s) by permitting all or substantially all of the molecules of the desired substance and the other compound(s) of the lower molecular weight(s) and some molecules of the solvent to penetrate through the membrane into the filtrate side external to said membrane, while preventing all or substantially all the molecules of the other compound(s) of the higher molecular weight(s) from passing through the membrane to the filtrate side. It is to be understood, however, that the above-quoted description does not necessarily mean that the desired substance has been completely freed from the molecules of the solvent used to prepare the solution of said desired substance, because it is usual to practice that the dialysis and even the in be not forced to proceed until the solvent has entirely been removed from the solution of the desired substance treated.

The membrane of the present invention may generally be used in any manner known per se for the ultrafiltration or the dialysis, that is to say, either with the membrane positioned in contact with a solution of the substance to be treated with or without applying a pressure on said solution, so that the membrane serves merely as a filter for said solution, or with the membrane positioned in contact with and between the phase of the solution of the substance to be treated and the pure phase of the solvent used to prepare said solution, so that the membrane can act to dialyse said solution. Accordingly, the membrane of the present invention may be called either an ultrafiltration membrane or a dialysis membrane, depending on the actual use.

The solution containing the substance to be treated may be prepared with an appropriate inorganic or organic solvent, e.g., water, alcohols, ketones, hydrocarbons etc., in which the cross-linked polyelectrolyte material constituting the membrane is insoluble.

Whether used as an ultrafiltration membrane or as a dialysis membrane, the micro-pores of a given average pore diameter present in the top layer act like meshes in a sieve. Thus, a solution to be treated, containing the desired substance and also contaminating or undesired compound(s) having different molecular weights and hence different molecular sizes, may microscopically be regarded as a mixture of various molecules of different molecular sizes. When this mixture is ultrafiltered or dialyzed by means of the present membrane it can be separated into two fractions; one fraction comprising molecules having molecular sizes equal to and larger than the minimum diameter of the micro-pores of the top layer and thus retained on the membrane, and the other fraction comprising the smaller molecular sizes permitted to pass, through the micro-pores, from one side to the opposite side of the membrane. This may be called the "molecular-sieving effect" of the membrane. Either may be collected or recovered as a desired fraction. Under these circumstances, we may designate the membrane of the present invention as a "molecular-sieve membrane" for a convenience of expressing collectively all the functions of the membrane which are effective to separate, concentrate or purify a substance.

Suitable examples of the acidic polyelectrolyte include polystyrene sulfonic acid, polyvinyl sulfonic acid, and their alkali or alkaline earth metal salts, particularly the sodium and calcium salts. A co-polymer of a styrene sulfonic acid or a vinyl sulfonic acid or an alkali metal salt thereof with a copolymerizable monomer, such as, e.g., styrene, may also be used as the water-soluble, acidic polyelectrolyte.

Suitable examples of the basic polyelectrolyte containing the quaternary ammonium groups include polyvinylbenzyl trimethyl ammonium hydroxide or its halides, particularly the chloride, as well as a co-polymer of vinylbenzyl trimethyl ammonium halide with a copolymerizable monomer. Further, the examples of the water-soluble, basic polyelectrolyte containing the pyridinium groups include polyvinyl methyl pyridinium hydroxide and its halides, particularly the chloride, as well as a co-polymer of vinyl methyl pyridinium halide with a copolymerizable monomer such as styrene.

The acidic and basic polyelectrolytes must normally be solid and capable of film formation, and therefore it is necessary that each should have a sufficiently high molecular weight of at least 50,000 and preferably of at least 100,000. Those having a molecular weight of lower than 50,000 cannot be used as their film-forming ability is poor. On the other hand, it is actually difficult to synthetize the polyelectrolytes of a molecular weight in excess of 700,000, and hence it is necessary that the molecular weight should be in the range of 50,000 to 700,000. The polyelectrolytes used may be either of straight chain or of branched chain type, as long as they are soluble in water. It is preferable that the acidic and basic polyelectrolytes used should carry respectively at least one sulfonic acid group or at least one quaternary ammonium or pyridinium group per three of the repeating monomeric units which constitute the polyelectrolyte molecules. If an acidic polyelectrolyte of such an acidity as to give a pH exceeding the stipulated upper limit pH of 2 is ionically cross-linked with a basic polyelectrolyte of such a basicity as gives a pH of less than the lower limit pH of 10, it is difficult to form the desired diffusive and continuous top surface layer and the sponge-like intermediate reinforcing layer in the film, because only a weak ionic linkage force can be achieved between the ionic poly groups. Even if the continuous top surface layer and intermediate reinforcing layer can be formed in the film, these layers would be of a lower mechanical strength and the permeation rate of water passing through them would be too low to make the membrane product practicably efficient for the dialysis and ultrafiltration processes.

Although in the present invention it is preferred that the acidic and basic polyelectrolytes be used in the ratio of 1:1 by equivalents to produce a membrane which as a whole is neutral in nature, they may be used at an equivalent ratio falling in a range of 1:2 to 2:1 at maximum and preferably in a range of 1:1.5 to 1.5:1. In these cases, the resulting basic or acidic membrane will be useful for certain special purposes, as it has a higher ability to adsorb water than that of the neutral membrane.

The diffusive continuous top surface layer, having the primary active role in the membrane, should be as thin as possible in order to give a water-permeation rate as high as possible, and thus it should preferably have a thickness on the order of $1\mu$, namely 10,000A. or less. It appears microscopically that within this top layer several, at most 20, molecules of the ionically cross-linked polymer are overlapped in the form of strata, forming a three-dimensional network. In addition, it may be estimated that this continuous top surface layer contains very many fine micro-pores of uniform diameter and interconnecting with each other across this layer, although these micro-pores cannot be observed and the structure of this layer merely exhibits denseness or solidness and continuity as viewed even under the electron microscope at 5,600 to 20,000× magnifications.

The intermediate reinforcing layer not only serves integrally to support and reinforce the upper continuous top surface layer, but it also tightly adheres to the low-most support, thereby serving to anchor the top layer to the support. The intermediate reinforcing layer also provides a cushioning action which presents the pressure or force applied to the membrane during operation or handling from being directly transmitted to the very thin and relatively fragile top layer. It is necessary that the intermediate layer have an appropriate porosity and thickness, such that it cannot prevent the passage of water or the compound(s) which have passed through the top layer. It has been found that the intermediate layer should preferably be on the order of about 0.1–0.2mm. in thickness. From electron-microscopic observation, it has been estimated that the intermediate reinforcing layer normally contains micro-pores of about 10 to 100 m$\mu$ diameter.

The continuous top surface layer and the intermediate reinforcing layer have a total thickness on the order of only 0.1 to 0.2mm. and, to impart a sufficiently practicable mechanical strength, they are fixed on a separate support. It is necessary that this support be made of a material, e.g., polypropylenes or polyamides, compatible with and highly adhesive to the material of the intermediate reinforcing layer. Among the available polyamides, polycaprolactams (namely 6-nylon) and polyhexamethylene adipamides (namely 6,6-nylon) are preferred, as these synthetic polymers are strongly adhesive to the above-mentioned cross-linked acidic and basic polyelectrolytes.

The support should exhibit a porous structure with a water-flow rate of 10 or more times higher than the water permeation rate of the continuous top surface layer, and hence of at least 0.5ml./cm.$^2$/min. as determined with water at 20°C. under a pressure difference of 760 mm Hg, because otherwise the whole body of the membrane would show a lower water-permeation rate, and the throughput of the membrane would be too low to be practicable. On the other hand, if the support material has pores of an excessive pore diameter, a breakdown can take place ultimately in the active top surface layer by the intermediate reinforcing layer and finally the continuous top surface layer collapsing into the pores of the support layer, due to the fact that these layers are subjected to the pressure applied to the membrane during its operation. Accordingly it is required that the maximum average pore diameter in the support should be limited to about 10$\mu$.

It is preferable that the support be a flat sheet or mat of about 0.1 to 2mm. thickness, prepared by using, as the substrate material, the fibers or filaments of one of the above-mentioned synthetic polymers, formed to a non-woven cloth with application of elevated temperature and a high rolling pressure, thereby smoothing the cloth surfaces and simultaneously affording the porous structure of properties which meet the above-mentioned requirements. The support sheet may also be in the shape of a tube or cylinder or bag, if desired. Thus, the membrane of the present invention may be formed into a bag or may be held by a supporting frame for use in the ultrafiltration or dialysis processes.

Referring to the accompanying drawing:

The FIGURE shows an electron microscope photomicrograph of the cross-section through the continuous top surface layer and the intermediate reinforcing layer of a membrane product according to the present invention, at a magnification of about 5,600.

In the production of the molecular-sieve membrane according to the present process, the inorganic salt which is incorporated into the solvent system should be restricted to sodium bromide, sodium iodide, calcium chloride, calcium bromide and calcium nitrate. From our experiments it has been found that the objects of the present invention cannot be achieved if other inorganic salts are employed. Although sodium bromide is most preferable, it is possible to select any suitable one or more salts from the above-mentioned class, depending on the natures of the acidic and basic polyelectrolytes used and depending on the average pore diameter of the micro-pores which are to be produced in the continuous top surface layer. Where one of such inorganic salts has been dissolved in the solvent system, it usually promotes the ionic dissociation of the acidic and basic polyelectrolytes subsequently introduced. It is known that the cations and anions derived from the inorganic electrolyte then become positioned between the molecules of the acidic and of the basic polyelectrolytes which are ionically dissociated in the same solution, whereby these oppositely charged polyelectrolytes can be prevented from coprecipating as otherwise would take place due to their ionic interaction, and whereby the solubilities of these polyelectrolytes may rather be increased.

In cooperation with the known action of the inorganic salt, the fact that the acetone-water mixture or the dioxane-water mixture constituting the solvent system has a dielectric constant of 50 to 78 is useful to insure that the oppositely charged polyelectrolytes are maintained in solution in the sol state and so prevented from the co-precipitation. The quantity of the inorganic salt may be selected to give an appropriate concentration depending on the actual value of the dielectric constant of the solvent system used, and on the nature of and the actual ionic strength values of the polyelectrolytes. Moreover, the value of the dielectric constant for the acetone-water mixture or the dioxane-water mixture may be selected to be appropriate in the range of 50 to 78 depending on the nature and the concentration of the inorganic salt used, and the natures and the ionic strengths of the polyelectrolytes used. An optimum value of the dielectric constant and also an optimum quantity of the salt to be used may readily be decided by carrying out preliminary experiments. If desired, dimethyl formamide or glycerine may be present in the acetone-water mixture or the dioxane-water mixture to a concentration of up to 5 percent by weight of the whole mixture.

If the total polyelectrolyte concentration is greater than the upper limit of the above-defined 2 to 8 percent range, the resulting solution is then too viscous to be spread or cast into a uniform and thin liquid film on the support; but if less than the lower limit, the solidified film is then too weak to be practicable.

In the present process, the described solution of polyelectrolytes is spread or cast into a thin liquid film on a support sheet in a conventional manner, for instance, in such a way that the support sheet is placed under tension on a flat glass plate or metal panel and the spreading solution applied uniformly on the top side of the support sheet by means of a conventional device such as doctor blade or roller.

From our experiments it has been found that about 0.15 to 0.4ml./cm.² of the film-forming solution is usually necessary to be applied to give a thickness of about 0.1 to 0.2mm. for the continuous top surface layer and the intermediate reinforcing layer. The liquid film applied will gradually be reduced in thickness during the subsequent steps. The thin liquid film so spread on the support sheet is then adjusted to be at a temperature of 10° to 50°C. and subsequently subjected to the treatment by which the dielectric constant value of the solvent system in the top surface layer of the applied film is increased while keeping said film at a temperature in said range of 10°-50°C.

The treatment for increasing the dielectric constant in the top surface layer of the liquid film may be performed either by evaporating the acetone or dioxane out of the surface by letting the supported liquid film stand in air at 10° to 50°C. for a period of 5 to 120 minutes, or by blowing a cold and inert gas, for example, nitrogen gas or air at about 5°C. onto the top surface to lower the temperature in the top surface layer, or by blowing dimethyl formamide vapor onto the top surface of the liquid film. When this treatment is continued for a period of 5–120 minutes, the cast liquid film can be gelled. If the period of this treatment is shorter than 5 minutes, the gelation of the liquid film cannot proceed completely, so that a satisfactory membrane is not produced; while if longer than 120 minutes, cracks or pin holes or larger holes can be formed in the resulting membrane.

It may be presumed that the gelation in this treatment takes place through such mechanism as mentioned below. It appears that, within the body of the applied film-forming solution, the ionic atmospheres of the acidic polyelectrolyte and of the basic polyelectrolyte are positioned in a regularly alternate manner and spaced from each other regularly at a constant distance through the action of the inorganic salt and the action of the dielectric constant of the solvent co-existing therein, so that a stationary state of balance is maintained between the ionic atmospheres of the electrolytes. Then the distances between the molecules of the acidic and basic polyelectrolytes are kept so large that the two polyelectrolytes can be prevented from co-precipitating, as otherwise would take place by cross-linking with each other due to the electric Coulomb forces, that is, due to the ionic interaction and linkage through their opposite ionically dissociated groups.

When the dielectric constant value in the solution is now increased by means of the above-mentioned treatment, the aforesaid balance can be lost with the result that both kinds of the polyelectrolytes have reduced distances between them, and at least portions of their opposite ionically dissociated groups begin to ionically link with each other until the gelation takes place in the solution. At this stage, however, the ions of the inorganic salt as well as the molecules of the water and the organic solvent (namely, the acetone or dioxane) still stand between the individual partially ionically cross-linked molecules of the acidic and basic polyelectrolytes which thus exhibit only a gelled condition.

The gelled liquid film on the support sheet is subsequently immersed in a bath of water at 10°–50°C. for a period of 5 minutes to 60 minutes, whereby the inorganic salt and the organic solvent are leached or extracted from the gelled top surface layer. It is thought that, by removal of the inorganic salt and the organic solvent, the acidic and basic polyelectrolytes existing in the gel state within the top surface layer achieve an enhanced degree of the ionic linkage with each other and from the continuous and dense layer comprised of the solid polymer. The intermediate layer between the gelled surface and the support remains a sol solution during the treatment step increasing the dielectric constant in the top layer. But in the water immersion treatment, the intermediate layer undergoes penetration by water coming through the surface layer and the support. The above-described balance maintained between the polyelectrolyte molecules present in the intermediate layer is then rapidly and severely broken by the action of the penetrating water, with the result that substantially all the molecules of the acidic and basic polyelectrolytes existing in said intermediate layer can relatively fast and accurately be reacted with each other and commence a rapid coprecipitation. For the above-mentioned reasons it is believed that the ionically cross-linked polymer within the intermediate layer exhibits the structure of higher porosity than that of the top surface layer of the film.

The gelled and solidified liquid film carried on the support is then removed from the water bath and dried in air at a temperature of 50° to 70°C. for a period of 3 minutes to 30 minutes, and thereafter rinsed with water at 10° to 50°C. for a period of 5 to 60 minutes. This drying and rinsing operation cycle is then repeated, preferably 5 times to 20 times.

By the repeated rinsing operations, the top and intermediate layers of the cross-linked polyelectrolyte film are completely freed from the inorganic salts and the organic solvent, and, with the remaining molecules of the acidic and basic polyelectrolytes still in the sol condition within the intermediate layer, the film is now directly and entirely subjected to the action of the penetrating water, and thus the course of the coprecipitation as mentioned above proceeds further in the intermediate reinforcing layer of the film. It is presumed that it is for these reasons that the cross-linked solid polymer of the acidic and basic polyelectrolytes could be coprecipitated in the sponge-like or highly porous structure within the intermediate layer, in contrast with the tight and continuous structure observed in the top layer. If the inorganic salt is only partly removed from the film through the above-mentioned aqueous immersion and rinsing treatment, as the remaining trace of the inorganic salt can later deposit as crystals, it would cause formation of pin-holes in the membrane product.

It is believed that the continuous top surface layer of the molecular-sieve membrane as produced by the process of the present invention attains the structure containing uniform micro-pores at an average pore diameter adjustable in the range of about 10–120A. for reasons presented by the following explanation. However, the present invention is limited in no way to this explanation.

It is known that the individual molecules of a polyelectrolyte in its sol solution take a configuration of a helix coil of several hundreds to several thousands angstroms in their dimensions; and also that the dimensions of these helical coils vary depending on the concentration and ionic strength of any electrolyte possibly co-existing in the polyelectrolyte solution. Accordingly, it is thought, the ionic atmospheres of the helical polyelectrolyte molecules, within the film-forming solution as prepared and used in the process, are subjected to the influences of the ionic strength of the co-existing inorganic salt and the adjusted dielectric constant of the solvent system, so that such ionic atmospheres of the oppositely charged polyelectrolyte molecules are arranged alternately and regularly at such a distance that the ionic interaction and linkage between them cannot take place there.

When the dielectric constant of the solvent system has been increased in the top surface layer, accordingly, the helical acidic and basic polyelectrolyte molecules present within the top surface layer muchly reduce their spacing while keeping their alternate and regular arrangement.

Therefore, the Coulomb forces acting between the dissociated anionic and cationic groups of the acidic and basic polyelectrolytes can be much enhanced, the acidic and basic polyelectrolyte molecules approach much closer to each other, and at least some of the ionically dissociated and oppositely charged acidic and basic polyelectrolyte groups achieve the ionic interaction and linkage, while some are left unreacted so that the ionic linkage does not occur completely. Thus the gel condition is shown by the top surface layer of the liquid film.

However, it is to be appreciated that the mechanism whereby the dielectric constant increase of the solvent system brings about the gelation in the top surface layer cannot yet be elucidated fully and exactly. Nevertheless, it is certain that the acidic and basic polyelectrolyte molecules are arranged in a regularly alternate manner at a regular intermolecular distance even in the gel formed within the top surface layer by the above-mentioned treatment, while the spaces between the polyelectrolyte molecules are filled with water molecules, ions of the inorganic salt, and molecules of the organic solvent. While this gelled condition prevails, when the top surface layer is immersed in a bath of water at 10° to 50°C. for 5 to 60 minutes, the inorganic salt ions and the organic solvent molecules can be extracted into the water bath from the gelled surface layer and from the spaces between the regularly spaced and alternating acidic and basic polyelectrolyte molecules, leaving spaces into which water molecules now penetrate. For this reason and owing to a further increase in the dielectric constant resulting from the removal of the organic solvent, the ionic interaction and ionic linkage at the remaining parts of the ionically dissociated groups of the polyelectrolytes further proceeds to completion, but during this time the described intermolecular spaces are kept substantially unchanged. Through this further ionic interaction and linkage, the much more fully cross-linked polymer achieves the firmly integrated three-dimensional network.

In this network, however, it is probable that the individual molecules of the polyelectrolytes do not show the normal interionic distance between their ionically dissociated groups but behave like the free ions; and that the polymer is present in the aqueous gel structure, because a surrounding sheath, consisting of the molecules of the primary bound water and secondary bound water, envelopes each of the ionically dissociated groups of the polyelectrolytes. The polymer, which has been cross-linked in the above-mentioned way and gained the firmly linked three-dimensional network, is insoluble in water and also in various common organic solvents, but it may again be dissolved by the solvent system used for the particular composition, if desired.

In the polymer network, the acidic and the basic polyelectrolyte molecules have still retained the regularly alternating and spaced arrangement. In addition, the spaces or gaps between the sheaths of the bound water which surround each of the ionically dissociated groups are very highly reproducible with a width or pore size of a constant value in the range of about 10–120A., provided that the solvent system of the same composition is employed, that acidic and basic polyelectrolytes of the same natures and the same molecular weights have been used as the starting material and processed under the same operation conditions.

Though the micro-pores present in the top surface layer of the membrane are so very small that they cannot be observed under an electron microscope at 20,000× magnification, it is easy to estimate the value of the average pore diameter. The estimation may be made, for example, by comparing the known molecular diameters of substances having substantially spherical molecules which respectively can and cannot pass or diffuse through the top surface layer and hence through the whole cross-section of the membrane, since molecular weights are generally correlated to molecular diameters, assuming that the molecules are substantially spherical in shape. (For example, a spherical molecular having a molecular weight on the order of 1,000,000 is taken as having a molecular diameter of approximately 200A.) Accordingly, once the average pore diameter of the micro-pores in the top surface layer of a membrane product has been estimated, it is easy for those skilled in the art to predict whether or not a substance of a known molecular weight can pass or diffuse through that membrane product.

The present molecular sieve membrane advantageously enables the ultrafiltration and dialysis processes to be carried out at a higher throughput, because it has a high permeability toward water frequently to be used as the medium, and enables a sharp separation of mixed substances or a purification of a crude product to be effected, as the micro-pores present in the top surface layer are uniform in their pore diameter so that all or substantially all the molecules having molecular diameters larger than the said average pore diameter are prevented from passing through the membrane.

The present invention is illustrated by the following examples, to which, however, the present invention is not limited.

EXAMPLE 1

As indicated in Table 1 below, film-forming solutions were prepared by dissolving various polyelectrolytes in various solvent systems having the compositions and different concentrations as specified below. As the support, there was used a smooth top surfaced sheet of polypropylene prepared by sintering a non-woven cloth of polypropylene fibers and then pressing the sintered cloth between a pair of rollers. The resulting support sheet, having an average pore diameter of 3μ and a thickness of 1.1mm, in turn was supported flattened on a glass plate. With aid of a doctor blade, the spreading solution was applied or cast at 20°C. as a liquid film of 0.5mm. uniform thickness over the top side of the polypropylene sheet. The applied liquid film was allowed to stand in open air at 20°C. for 30 minutes to evaporate the acetone or dioxane from its top surface, which was then observed to have become cloudy. The liquid film, as supported by the polypropylene sheet on the glass plate, was then immersed in a water bath at 20°C for 30 minutes, was removed from the water bath, then dried for 5 minutes in air at 50°C., and rinsed with water for 5 minutes by dipping into the rinsing water at room temperature (about 17°C.). This cycle of drying and rinsing operations was repeated 10 times, and thereafter the supported molecular sieve membrane so produced was removed from the glass plate.

The properties of the membrane products so obtained are tabulated in Table 1 below. They were neutral in nature, as the acidic and basic polyelectrolytes were used in such proportions that the number of the ionically dissociable groups present in the acidic polyelectrolyte used was equal to the number of the ionically dissociable groups present in the basic polyelectrolyte used. That is to say, the values of the term: (quantity in g. of a polyelectrolyte used) × (specific ion-exchange capacity in meq./g. of the polyelectrolyte used) were equal for both the acidic and basic polyelectrolytes employed in this case. The concentrations of the polyelectrolytes are given as the total quantities of the acidic and basic polyelectrolytes dissolved in the spreading solutions.

The combined thickness of the continuous top surface layer and the intermediate reinforcing layer in the membrane products was found to be about 0.1 to 0.2 mm.

TABLE 1

| Test No. | Polyelectrolytes used Acidic | Polyelectrolytes used Basic | Total concentration of polyelectrolytes in percent by weight | Solvent system used Composition in percent by weight NaBr | Solvent system used Acetone | Solvent system used Water | Dielectric constant at 20° C. | Water permeation rate through membrane in ml./cm.² min.×10⁴** | Retention of Cytochrome C. in percent*** | Top surface layer of membrane, average micropore diameter estimated in A.**** | Remarks |
|---|---|---|---|---|---|---|---|---|---|---|---|
| 1 | PSSNaᵃ | PVBTACᵇ | 2.0 | 20 | 18 | 62 | 66.8 | 2,900 | 60.0 | 120 | |
| 2 | PSSNaᵃ | PVBTACᵇ | 3.0 | 20 | 18 | 62 | 66.8 | 2,261 | 89.6 | 110 | |
| 3 | PSSNaᵃ | PVBTACᵇ | 5.0 | 20 | 18 | 62 | 66.8 | 1,280 | 95.1 | 60 | Weak membrane. |
| 4 | PSSNaᵃ | PVBTACᵇ | 7.0 | 20 | 18 | 62 | 66.8 | 380 | 99.5 | 20 | |
| 5 | PSSNaᵃ | PVBTACᵇ | 7.6 | 20 | 18 | 62 | 66.8 | 110 | 99.9 | 10 | |
| 6 | PSSNaᵃ | PVBTACᵇ | 8.0 | 20 | 18 | 62 | 66.8 | | | | |
| 7 | PSSNaᵃ | PVBTACᵇ | 4.0 | 20 | 21 | 59 | 64.4 | 806 | 88.8 | 70 | Highly viscous solution somewhat difficult to spread. |
| 8 | PSSNaᵃ | PVBTACᵇ | 4.0 | 20 | 20 | 60 | 65.2 | 976 | 85.3 | 70 | |
| 9 | PSSNaᵃ | PVBTACᵇ | 4.0 | 20 | 18 | 62 | 66.8 | 1,486 | 88.6 | 70 | |
| 10 | PSSNaᵃ | PVBTACᵇ | 4.0 | 20 | 17 | 63 | 67.7 | 4,916 | | | |
| 11 | PSSNaᶜ | PVBTACᵇ | 2.0 | 38 | 3 | 59 | 78.0 | | | | Poor reproducibility in the formation of membrane. |
| 12 | PSSNaᶜ | PVBTACᵇ | 2.0 | 30 | 10 | 60 | 71.6 | 290 | | | |
| 13 | PSSNaᶜ | PVBTACᵇ | 2.0 | 25 | 25 | 50 | 60.0 | 160 | | | |
| 14 | PSSNaᶜ | PVBTACᵇ | 2.0 | 25 | ᵈ25 | 50 | 51.0 | 40 | | | |
| 15 | PSSNaᶜ | PVBTACᵇ | 2.0 | ᵉ25 | ᶜ27 | 48 | 46 | | | | No membrane formed (comparative test). |
| 16 | PSSNaᶜ | PVBTACᵇ | 3.0 | 20 | ᵈ20 | 60 | 57.5 | 750 | 96.5 | 60 | |
| 17 | PSSNaᶜ | PVBTACᵇ | 4.5 | 20 | ᵈ20 | 60 | 57.5 | 300 | 99.5 | 55 | |
| 18 | PSSNaᶜ | PVBTACᵇ | 4.5 | ᵉ20 | 20 | 60 | 65.2 | 139 | 99.5 | 55 | |
| 19 | PVSNa-Sᶠ | PVBTACᵇ | 3.0 | 20 | 20 | 60 | 65.2 | 402 | 60.0 | | |
| 20 | PVSNa-Sᶠ | PMVPC-Sᵍ | 3.0 | 10 | 20 | 70 | 66.5 | 200 | 40.5 | | Weak membrane. |
| 21 | PSSNaᶜ | PMVPC-Sᵍ | 3.0 | 20 | 20 | 60 | 65.2 | 485 | 51.4 | | |

Referring to Table 1:
* Di-electric constants shown are the value as determined for the acetone-water mixture at 20°C.
** Water-permeation rate in ml./cm.²/min. was determined at 20°C. with a pressure difference of 4Kg./cm². (All the values for the water-permeation rate given in the subsequent examples were measured in the same manner.)
*** Retention of Cytochrome C is a useful standard to determine whether or not a substance having a molecular weight of the order of 10,000 can pass through the membrane tested.

The figures for the "Retention of Cytochrome C" were obtained by ultrafiltering, through the tested membrane in a usual manner, an aqueous solution containing Cytochrome C at a concentration of 0.2 mg./ml. and tris-acetate buffer with a pH of 7.4 at a solution temperature of about 20°C. and under a pressure difference of 4Kg./cm.$^2$, until the solution being filtered was reduced to one-fifth its original volume, determining the total amount (C) (in grams) of Cytochrome C present in the collected filtrate as well as the total amount ($C_o$) (in grams) of Cytochrome C used in the original solution, and then calculating according to the following equation:

$$[(C_o - Co] \times 100$$

In all the subsequent examples, the figures for the retention of Cytochrome C or other compounds were evaluated in the same manner as mentioned above.

Further referring to Table 1:

Notes:
1. "PSSNa (a)" means a polystyrene sulfonic acid sodium salt which has a $\eta_{sp}/c$ value of 30, as determined at c = 0.5 g./100ml., a molecular weight of 450,000 and an ion-exchange capacity of 4.74 meq./g. ,["$\eta_{sp}/c$," here and throughout, being the "reduced specific viscosity" of the polyelectrolyte used].
2. "PVBTAC (b)" means a polyvinyl benzyl trimethyl ammonium chloride which has a $\eta_{sp}/c$ value of 3.5, as determined at c = 0.5 g./100 ml., a molecular weight of 60,000 and an ion-exchange capacity of 3.38meq./g.
3. "PSSNA (c)" means a polystyrene sulfonic acid sodium salt which has a $\eta_{sp}/c$ value of 15, as determined at c = 0.5g./100ml., a molecular weight of 300,000 and an ion-exchange capacity of 4.86meq./g.
4. (d) means that the acetone was replaced by dioxane in this test.
5. (e) means that the NaBr was replaced by $CaBr_2$ in this test.
6. "PVSNa-s (f)" means a copolymer of vinyl sulfonic acid sodium salt with styrene which has a $\eta_{sp}/c$ value of 8.6, a molecular weight of 160,000 and an ion-exchange capacity of 1.50meq./g.
7. "PMVPC-S(g)" means a co-polymer of methyl 2-vinyl pyridinium chloride with styrene which has a $\eta_{sp}/c$ value of 14, a molecular weight of 280,000 and an ion-exchange capacity of 3.78 meq./g.

In order to observe the influences of the molecular weights and equivalent ratio in the charged quantities of the polyelectrolytes as well as the influence of the nature of the inorganic salt added, a further series of tests was carried out according to the same procedures and under the same conditions as in the above-mentioned tests. The results obtained are shown in Table 2 below.

TABLE 2

| Test No. | Polyelectrolytes used Acidic | Polyelectrolytes used Basic | Total concentration of polyelectrolytes in percent by weight | Solvent system used Composition in percent by weight NaBr | Acetone | Water | Dielectric constant at 20° C.* | Water permeation rate through membrane in ml./cm.$^2$/min.×10$^{4**}$ | Retention of cytochrome C, in percent*** | Top surface layer of membrane, average micropore diameter estimated in A.**** | Remarks |
|---|---|---|---|---|---|---|---|---|---|---|---|
| 22 | PSSNa $^h$ | PVBTAC $^b$ | 4.5 | 20 | 20 | 60 | 65.2 | | | | No membrane formed (comparative test). |
| 23 | PSSNa $^c$ | PVBTAC $^i$ | 4.5 | 20 | 20 | 60 | 65.2 | | | | |
| 24 | PSSNa $^a$ | PVBTAC $^b$ | 4.5 | 20 | 20 | 60 | 65.2 | 840 | 95.0 | 60 | Membrane with no reproducibility. |
| 25$^k$ | PSSNa $^a$ | PVBTAC $^b$ | 5.0 | 20 | 20 | 60 | 65.2 | 600 | 98.0 | 55 | |
| 26 | PSSNa $^a$ | PVBTAC $^b$ | 4.0 | $^l$ 20 | 20 | 60 | 65.2 | | | | No membrane formed (comparative test). |
| 27 | PSSNa $^a$ | PVBTAC $^b$ | 4.0 | $^m$ 20 | 20 | 60 | 65.2 | 160 | 99.4 | 60 | |
| 28 | PSSNa $^a$ | PVBTAC $^b$ | 4.0 | $^n$ 20 | 20 | 60 | 65.2 | 220 | 98.8 | 55 | |
| 29 | PSSNa $^a$ | PVBTAC $^b$ | 4.0 | $^o$ 20 | 20 | 60 | 65.2 | | | | |
| 30 | PSSH $^p$ | PVBTAOH $^q$ | 4.1 | 20 | 20 | 60 | 65.2 | 920 | 85.0 | | Membrane obtained with similar properties to those of membrane of Test No. 8 of Table 1. |
| 31 | PSSH $^p$ | PVBTAC $^b$ | 4.25 | 20 | 20 | 60 | 65.2 | 930 | 85.2 | | |
| 32 | PSSCa $^r$ | PVBTAC $^b$ | 4.5 | 20 | 20 | 60 | 65.2 | 420 | 99.9 | | |
| 33 | PSSH $^p$ | PMVPC-S $^g$ | 4.0 | 20 | 20 | 60 | 65.2 | 760 | 88.0 | | |

Referring to Table 2:

Notes:
8. "PSSNA(h)" means a polystyrene sulfonic acid sodium salt which has a $\eta_{sp}/c$ value of 2.0, a molecular weight of 30,000 and an ion-exchange capacity of 4.58meq/g.
9. "PVBTAC(i)" means a polyvinyl benzyl trimethyl ammonium chloride which has a $\eta_{sp}/c$ value of 2.0, a molecular weight of 40,000 and an ion-exchange capacity of 3.20 meq./g.
10. (j) means that the PSSNa was used in this test in a quantity twice greater than the quantity of the PVBTAC by equivalent, and that the figure given for the concentration of the polyelectrolytes used was in total percent by weight.
11. (k) means that the PVBTAC was used in this test in a quantity twice greater than the quantity of the PSSNa by equivalents.
12. (l) means that the NaBr was replaced by NaCl in this test.
13. (m) means that the NaBr was replaced by $CaCl_2$ in this test.
14. (n) means that the NaBr was replaced by $Ca(NO_3)_2$ in this test.
15. (o) means that the NaBr was replaced by $MgCl_2$ in this test.
16. "PSSH(p)" means a polystyrene sulfonic acid which was obtained by converting the "PSSNa(a)" identified in Note 1 of Table 1 into the free acid by treating with ion-exchange resin.
17. "PVBTAOH(q)" means a polyvinyl benzyl trimethyl ammonium hydroxide, obtained by converting into the free base the "PVBTAC(b)" identified in Note 2 of Table 1 by treating with ion-exchange resin.
18. "PSSCa(r)" means a calcium polystryene sulfonate, obtained by neutralizing "PSSH(p)" with calcium hydroxide.

EXAMPLE 2

In this example, a series of tests was carried out to estimate the retention or permeability of membranes produced in the same manner as in Example 1. In these tests, the retention of various substances having different molecular sizes was determined in the same way as mentioned in Example 1. The results obtained are tabulated in Table 3 below.

Also an aqueous solution containing 1mg./ml. of Cytochrome C and 1mg./ml. of raffinose was ultrafiltered in a usual way by means of the above-mentioned membrane (b). After the solution was filtered once, the solution of reduced volume was diluted with water to the original volume and again filtered by means of the same membrane. It was observed that 5 percent of the Cytochrome C and 85 percent of the raffinose present could

TABLE 3.—RETENTION CHARACTERISTIC OF VARIOUS MEMBRANES (Retention percent)

|  | Hemoglobin (mol weight 67,000 and estimated mol diameter 80 A.) | Tripsin (mol weight 20,000) | Cytochrome C (mol weight 12,600, estimated mol diameter 45 A.) | Insulin (mol weight 5,000, estimated mol diameter 30 A.) | Raffinose (mol weight 594, estimated mol dimeter 13 A.) | Glucose (mol weight 180, estimated mol diameter 8 A.) | Urea (mol weight 60, estimated mol diameter 5 A.) |
|---|---|---|---|---|---|---|---|
| Membrane,a percent | 100 | 99.0 | 96.0 | 70 | 60 | 0 | 0 |
| Membrane,b percent | 100 | 100 | 100 | 100 | 75 | 0 | 0 |
| Membrane,c percent | 100 | 100 | 100 | 100 | 95 | 33 | 0 |

The membranes (a), (b) and (c) tested were produced with PSSNa and the PVBTAC as specified in the notes 1) and 2) of Table 1 at the total polyelectrolyte concentrations of 4.0 percent, 6.5 percent and 7.5 percent by weight, respectively, in a solvent system of the composition of 21 percent NaBr-18 percent acetone-62 percent water.

From the tabulated results it may be seen that when the polyelectrolytes and the solvent system are suitably selected, by the present invention, it is easy to produce a membrane which exhibits a practicably high water permeability and which is optionally adjustable for the molecular sizes of substances which are retained by or allowed to pass through the membrane.

In a further series of tests the ultrafiltration was carried out using the above-mentioned membranes (a), (b) and (c). Thus, an aqueous solution containing 1mg./ml. of Cytochrome C, 1mg./ml. of glucose and 1mg./ml. of ammonium sulfate was filtered by the membrane (a) in a usual ultrafiltration procedure. After the solution was filtered once, the solution of reduced volume was diluted with water to the original volume, and again filtered by means of the same membrane. It was then observed that 1 percent of the Cytochrome C, 100 percent of the glucose and 100 percent of the ammonium sulfate could be passed through the membrane (a) from the solution into the filtrate, so that the purification of Cytochrome C was achieved.

be removed from the solution.

EXAMPLE 3

The molecular-sieve membrane was made in a way similar to that stated in Example 1, except that the working conditions were changed for the hereinafter mentioned operations. When the temperature and period for the evaporation of the acetone from the spread liquid film were changed as described in Table 4 and Table 5, as there tabulated, the membrane products varied in their properties such as water-permeation rate and "Retention" of Cytochrome C. When the period of the water-immersion treatment after surface layer gelation and the temperature of the water during the immersing operation were changed as described in Table 6 and Table 7, the membrane products also varied in their properties as there tabulated.

When the number of cycles of the drying and water-rinsing operations as well as the period of the single rinsing operation were changed, the molecular-sieve membrane properties varied as shown in Table 8 and Table 9. The PSSNa and the PVBTAC used in this Example 3 were of the same natures as those specified in the notes 2) and 3) of Table 1 of Example 1, respectively. The acidic and basic polyelectrolytes were used at a total concentration of 4.6 percent by weight, and the solvent system used had a composition of 20 percent NaBr-20 percent acetone-60 percent water.

TABLE 4

| | | | | | |
|---|---|---|---|---|---|
| Evaporation temperature (° C.) | 5 | 10 | 30 | 50 | 70 |
| Evaporation period (min.) | 30 | 30 | 30 | 30 | 30 |
| Water permeation rate (ml./cm.²/min.) | | 652×10⁻⁴ | 480×10⁻⁴ | 400×10⁻⁴ | 260×10⁻⁴ |
| Retention of Cytochrome C (percent) | | 96.0 | 96.0 | 91.8 | 65.7 |
| Remark | (¹) | | | | |

¹ Weak membrane.

TABLE 5

| | | | | | | | | |
|---|---|---|---|---|---|---|---|---|
| Evaporation period (min.) | 2 | 4 | 5 | 6 | 15 | 30 | 60 | 120 | 150 |
| Evaporation temperature (° C.) | 20 | 20 | 20 | 20 | 20 | 20 | 20 | 20 | 20 |
| Water permeation rate (ml./cm.²/min.) | | 550×10⁻⁴ | 550×10⁻⁴ | 548×10⁻⁴ | 530×10⁻⁴ | 520×10⁻⁴ | 490×10⁻⁴ | 470×10⁻⁴ | 460×10⁻⁴ |
| Retention of Cytochrome C (percent) | | 97.0 | 97.0 | 96.8 | 96.0 | 96.0 | 94.1 | 93.8 | 89.1 |

TABLE 6

| | | | | | |
|---|---|---|---|---|---|
| Temperature of immersing water (° C.) | 5 | 10 | 30 | 50 | 70 |
| Period of water immersion (min.) | 20 | 20 | 20 | 20 | 20 |
| Water permeation rate (ml./cm.²/min.) | 600×10⁻⁴ | 580×10⁻⁴ | 510×10⁻⁴ | 480×10⁻⁴ | |
| Retention of Cytochrome C (percent) | 97.0 | 96.8 | 96.8 | 96.4 | |

TABLE 7

| Period of water immersion (min.) | 3 | 5 | 6 | 15 | 30 | 60 | 90 |
|---|---|---|---|---|---|---|---|
| Temperature of immersing water (°C.) | 20 | 20 | 20 | 20 | 20 | 20 | 20 |
| Water permeation rate (ml./cm.²/min.) | 500×10⁻⁴ | 510×10⁻⁴ | 520×10⁻⁴ | 520×10⁻⁴ | 520×10⁻⁴ | 520×10⁻⁴ | 520×10⁻⁴ |
| Retention of Cytochrome C (percent) | 92.8 | 93.0 | 94.8 | 95.9 | 96.8 | 96.9 | 96.8 |

TABLE 8

| Number of times for repetition of water-rinsing and drying operations | 3 | 5 | 10 | 20 | 30 |
|---|---|---|---|---|---|
| Water permeation rate (ml./cm.²/min.) | 580×10⁻⁴ | 540×10⁻⁴ | 520×10⁻⁴ | 518×10⁻⁴ | 520×10⁻⁴ |
| Retention of Cytochrome C (percent) | 93.2 | 95.9 | 96.8 | 96.8 | 96.6 |

TABLE 9

| Period of a single water-rinsing operation (min.) | 3 | 5 | 30 | 60 | 90 |
|---|---|---|---|---|---|
| Period for a single drying operation (min.) | 20 | 20 | 20 | 20 | 20 |
| Water permeation rate (ml./cm.²/min.) | 560×10⁻⁴ | 420×10⁻⁴ | 518×10⁻⁴ | 518×10⁻⁴ | 517×10⁻⁴ |
| Retention of Cytochrome C (percent) | 94.8 | 96.8 | 96.7 | 96.7 | 96.7 |

EXAMPLE 4

In the same manner and using the same solvent system composition and the same polyelectrolytes as those specified for the test No. 8 of Example 1, a film-forming solution was prepared, applied and spread to a film of 0.5mm. depth on the support. While the supported liquid film was held on the glass base plate, either it was introduced into a two-mouthed desiccator, or the space over the liquid film was covered as rapidly as possible by means of a two-mouthed dish-shaped covering. A stream of air, cooled to about 5°C. and completely freed from dusts, was blown through one of the mouths into the desiccator or covering onto the top surface of the film for 60 to 120 minutes. In another test, the cold cleaned air stream was firstly bubbled through a liquid bath of and saturated with the vapor of dimethyl formamide and then blown onto the top surface of the film for 30 to 120 minutes. The gelation began to take place at the top surface of the film. When the above-described treatment for increasing the dielectric constant in the supported liquid film had been completed, the water-immersing treatment and the water-rinsing and drying treatments were carried out in the same way as in Example 1.

There were obtained molecular-sieve membranes which had approximately the same properties as those prepared in test No. 8 of Table 1 in Example 1.

EXAMPLE 5

Molecular-sieve membranes were produced in the same way as in Example 1 except that there were used support sheets 1.0mm. thick and of different materials. The supports were prepared by forming a non-woven cloth from fibers of the different materials as noted in Table 10 below and subsequently roll-working the cloth in the same manner as stated for the support sheet used in Example 1. The molecular-sieve membranes thus prepared were examined for the adhesion between the support layer and the intermediate reinforcing layer. Furthermore, visual and optical microscopic observations were made to estimate the degree to which the intermediate reinforcing layer of the membrane could cave in the pores of the support layer when the molecular-sieve membrane had been employed to carry out the determination of the retention of Cytochrome C. The results are tabulated in Table 10 below.

TABLE 10

| Materials of the support | Average pore diameter in the support | Water permeation rate (ml/cm²/min.) | Adhesion between the intermediate layer and the support | Degree of caving |
|---|---|---|---|---|
| 6-Nylon | 10 μ | | + | Slight caving |
| 6,6-Nylon | 10 μ | | + | Slight caving |
| Polypropylene | 10 μ | 6.0 | ±+ | Slight caving |
| Polypropylene | 5 μ | 2.0 | +++ | Little caving |
| Polypropylene | 3 μ | 0.8 | +++ | No caving |
| Polypropylene | 1 μ | 0.5 | +++ | No caving |
| Polypropylene | 11 μ | ca. 7.0 | +++ | Considerable caving |
| 6-Nylon | 38 μ | | + | Complete caving |
| 6,6 Nylon | 38 μ | | + | Complete caving |
| Cellulose | 10 μ | | | |
| Cellulose acetate | 10 μ | | | |
| "Saran" (polyvinylidene chloride) | 38 μ | | | |

Note: In the above Table 10 the more numerous the symbol +, the better is the adhesion; while the symbol − means a poor adhesiveness. Thus, + means that the molecular-sieve membrane could be formed; but it could not withstand practical use due to an insufficient adhesion between the cross-linked polyelectrolyte layer and the support. ++ means that a practicable supported membrane was produced but had relatively low mechanical strength. +++ means that the membrane produced had mechanical strength high enough to be practically applied owing to the better adhesion between the cross-linked polyelectroylte layer and the support.

What we claim is:

1. A membrane adapted to be used in ultrafiltration and dialysis processes which comprises:
   a. a diffusive continuous top surface layer on the order of 1μ in thickness, which is formed of a polymer produced by ionically cross-linking, at a ratio of 2:1 to 1:2 by equivalents, a water-soluble acidic polyelectrolyte, or a salt thereof, having a molecular weight of from about 50,000 to about 700,000 and containing a sufficient number of sulfonic acid groups to give a pH of up to 2 when said acidic polyelectrolyte is dissolved in the form of its free acid at a concentration of 0.6 to 5.4 percent by weight in water, with a water-soluble basic polyelectrolyte, or a salt thereof, having a molecular weight of 50,000 to 700,000 and containing a sufficient number of quaternary ammonium groups or pyridinium groups to give a pH of at least 10 when said basic polyelectrolyte is dissolved in the form of its free base at a concentration of 0.6 to 5.4 percent by weight in water;

said top layer showing, under electron microscope observation at 5,600x magnification, a dense and continuous structure containing micro-pores of uniform size having a selected average pore diameter within the range of about 10 to 120 A;

b. a reinforcing intermediate layer formed of the ionically cross-linked polymer of the same nature as that of the polymer material of and integral with said top surface layer and which exhibits a structure micro-porous but rather sponge-like as observed under an electron microscope at 5,600x magnification; and c. a porous support to which the material of said intermediate layer is tightly adherent, said support being formed of a polymer selected from polypropylenes and polyamides and having a porous structure containing pores of an average pore diameter of up to $10\mu$ and a water-flow rate of higher than 0.5ml./cm.$^2$/min. as determined with water at 20°C. and at a pressure difference of 760 mm Hg.;

said top layer, for attainment of said selected average pore diameter, produced under selectively controlled and reproducible conditions as by choosing suitably the natures, molecular weights and concentrations of the polyelectrolytes used as well as the process conditions for ionically cross-linking said polyelectrolytes within the above specified ranges.

2. A membrane as claimed in claim 1 in which the acidic polyelectrolyte is selected from the group consisting of polystyrene sulfonic acids and sodium salt and calcium salt thereof.

3. A membrane as claimed in claim 1 in which the acidic polyelectrolyte is a copolymer of styrene with vinyl sulfonic acid, or its alkali metal salt.

4. A membrane as claimed in claim 1 in which the basic polyelectrolyte is a polyvinylbenzyl trimethyl ammonium halide.

5. A membrane as claimed in claim 1 in which the basic polyelectrolyte is a copolymer of styrene with a methyl-2-vinyl pyridinium halide.

6. A membrane as claimed in claim 1 in which the top layer and the intermediate layer are formed of an ionically cross-linked polymeric reaction product of a polystyrene sulfonic acid with a polyvinylbenzyl trimethyl ammonium hydroxide.

7. A membrane as claimed in claim 1 in which the top layer and the intermediate layer of the membrane are formed of an ionically cross-linked polymeric reaction product of a polystyrene sulfonic acid with a polyvinylbenzyl trimethyl ammonium halide.

8. A membrane as claimed in claim 1 in which the top layer and the intermediate layer are formed of an ionically cross-linked polymeric reaction product of an alkali or alkaline earth metal salt of a polystyrene sulfonic acid with a polyvinylbenzyl trimethyl ammonium halide.

9. A membrane as claimed in claim 1 in which the top layer and the intermediate layer are formed of an ionically cross-linked polymeric reaction product of a polystyrene sulfonic acid with a polymer-2-vinyl-pyridinium halide.

10. A membrane as in claim 1 in which the top layer and the intermediate layer are formed of an ionically-cross-linked polymeric reaction product of an alkali or alkaline earth metal salt of a polystyrene sulfonic acid with a polymethyl-2-vinyl-pyridinium halide.

11. A membrane as claimed in claim 1 in which the top layer and the intermediate layer are formed of an ionically cross-linked polymeric reaction product of an alkali metal salt of a styrene/vinyl sulfonic acid copolymer with a polyvinylbenzyl trimethyl ammonium halide.

12. A membrane as claimed in claim 1 in which the top layer and the intermediate layer are formed of an ionically cross-linked polymeric reaction product of an alkali metal salt of a styrene/vinyl sulfonic acid copolymer with a polymethyl-2-vinyl pyridinium halide.

13. A membrane as claimed in claim 1 in which the top layer and the intermediate layer of the membrane have a total thickness on the order of 0.1–0.2mm.

14. A membrane as claimed in claim 1 in which the porous support is derived from a sheet of a non-woven cloth of fibers of a material selected from the polypropylenes and polyamides, said sheet smoothened at its faces by compressing the cloth in the sintered state between a pair of rollers to a thickness of about 0.1 to 2.0mm so as to impart thereto a porosity such that the average pore diameter of the sheet is up to $10\mu$ but the flow rate of water passing through the sheet amounts to a value of higher than 0.5ml./cm.$^2$/min. at 20°C. and at a pressure difference of 760mm Hg.

15. A process for the production of a membrane as claimed in claim 1, which comprises:

i. preparing an organic solvent-water type solvent system by dissolving at least one of sodium bromide, sodium iodide, calcium chloride, calcium bromide and calcium nitrate to a concentration of 10 to 35 percent by weight of the resulting solvent system into a mixture of acetone and water or into a mixture of dioxane and water mixed together at such a ratio as to give a dielectric constant value of 50 to 78 when determined at 20°C., ii. dissolving, into said solvent system to a total concentration of 2 to 8 percent by weight of the solvent system at a ratio of 2:1 to 1:2 by equivalents, a water-soluble, acidic polyelectrolyte, or a salt thereof, having a molecular weight of 50,000 to 700,000 and containing a sufficient number of sulfonic acid groups to give a pH of up to 2 where said acidic polyelectrolyte is dissolved in the form of its free acid in water at a concentration of 0.6 to 5.4 percent by weight and a water-soluble, basic polyelectrolyte, or a salt thereof, having a molecular weight of 50,000 to 700,000 and containing a sufficient number of quaternary ammonium groups or pyridinium groups to give a pH of at least 10 where said basic polyelectrolyte is dissolved in the form of its free base in water at a concentration of 0.6 to 5.4 percent by weight, iii. spreading the resulting solution or sol solution of the polyelectrolyte as a thin uniform liquid film onto a support sheet made of a polypropylene or polyamide, said support sheet exhibiting a porous structure containing pores of an average pore diameter of up to $10\mu$ but showing a water-flow rate higher than 0.5 ml./cm.$^2$/min. as determined with water at 20°C. and under a pressure difference of 760mm Hg, iv. treating the film at a temperature of from 10° to 50°C. to increase the dielectric constant value of the solvent system in the top surface layer of said thin liquid film, v. continuing this treatment for a period of from 5 to 120 minutes to bring about gelation in the top surface layer of the liquid film while the intermediate layer positioned between said top surface layer and the support is maintained in the sol condition, vi. immersing the surface-gelled liquid film with the support sheet into a bath of water at 10° to 50°C. for a period of 5 to 60 minutes to remove at least parts of the inorganic salt and of the organic solvent from the film to solidify the entire film thickness, vii. withdrawing the solidified film with the support from the water bath, viii. drying the composite of the solidified film and the support sheet at a temperature of 50° to 70°C. for a period of 3 to 30 minutes, ix. then rinsing said composite with water at from 10° to 50°C. for a period of 5 to 60 minutes, and x. repeating the above cycle of drying and rinsing operations until the solidified film on the support is completely free of the inorganic salt and of the organic solvent, xi. the natures, molecular weights and concentrations of the polyelectrolytes used, the natures and numbers of the ionically dissociable groups of the polyelectrolytes, the natures and concentrations of the inorganic salts used etc. as well as the ratio of the organic solvent to water and the process conditions for gelation and water-immersion during the formation of the gelled and solidified film of the crosslinked polyelectrolyte polymers, being selectively and reproducibly controlled within the above-referred ranges so as to produce a diffusive continuous top surface layer of said solidified film having a dense and continuous structure containing micropores of uniform size having said selected average pore diameter within the range of about 10 to 120 Å.

16. A process as claimed in claim 15 in which said polyelectrolytes are respectively a polystyrene sulfonic acid, and a polyvinylbenzyl trimethyl ammonium hydroxide.

17. A process as claimed in claim 15 in which said polyelectrolytes are respectively a polystyrene sulfonic acid, and a polyvinylbenzyl trimethyl ammonium halide.

18. A process as claimed in claim 15 in which said polyelectrolytes are respectively an alkali or alkaline earth metal salt of a polystyrene sulfonic acid and a polyvinylbenzyl trimethyl ammonium halide.

19. A process as claimed in claim 15 in which said polyelectrolytes are respectively a polystyrene sulfonic acid, and a polymethyl-2-vinyl pyridinium halide.

20. A process as claimed in claim 15 in which said polyelectrolytes are respectively an alkali or alkaline earth metal salt of a polystyrene sulfonic acid and a polymethyl-2-vinyl-pyridinium halide.

21. A process as claimed in claim 15 in which said polyelectrolytes are respectively an alkali metal salt of a styrene/vinyl sulfonic acid copolymer, and a polyvinyl benzyl trimethyl ammonium halide.

22. A process as claimed in claim 15 in which said polyelectrolytes are respectively an alkali metal salt of a styrene/vinyl sulfonic acid copolymer, and a polymethyl-2-vinyl pyridinium halide.

23. A process as claimed in claim 15 in which said polyelectrolytes are present in a ratio of 1:1 by equivalents.

24. A process as claimed in claim 15 in which the solvent system is a mixture of sodium bromide, acetone and water containing 10 to 30 percent by weight of sodium bromide, 1 to 25 percent by weight of acetone and the balance water, and showing a dielectric constant value of 50 to 78 as determined at 20°C.

25. A process as claimed in claim 15 in which the treatment for increasing the dielectric constant value of the solvent system in the said top layer is effected by allowing the supported liquid film to stand in air at 10° to 50°C for a period of 5 to 120 minutes during which the organic solvent is evaporated from the top surface of the liquid film.

26. A process as claimed in claim 15 in which the treatment for increasing the dielectric constant value of the solvent system in the top layer of the liquid film applied on the support sheet is effected by keeping the supported liquid film in air at a temperature of 10° to 50°C. and then blowing a stream of an inert gas at a temperature on the order of 5°C. onto the top surface of the liquid film for a period of 5 to 120 minutes.

27. A process as claimed in claim 15 in which the treatment for increasing the dielectric constant value of the solvent system in the applied liquid film is carried out by keeping the supported film in air at 10° to 50°C. and then blowing a dimethyl formamide vapor-saturated air stream at 5°C. onto the top surface of the liquid film for a period of from 5 to 120 minutes.

* * * * *

UNITED STATES PATENT OFFICE
CERTIFICATE OF CORRECTION

Patent No. 3,737,045                                Dated          June 5, 1973

Inventor(s)       Koichi Hashimoto et al.

It is certified that error appears in the above-identified patent and that said Letters Patent are hereby corrected as shown below:

On the cover sheet [73] Assignee, "Uivac Corporation" should read -- Ulvac Corporation --. Column 5, line 64, "usual to practice that the dialysis and even the in be not" should read -- usual in practice that the dialysis and even the ultrafiltration be not --. Column 15, the fifth line below Table 2, "[($C_o$-Co] x 100" should read -- [($C_o$-C)/$C_o$] x 100 --; Column 15, fifth line from bottom "6. "PVSNa-s (f)" " should read -- 6. "PVSNa-S(f)" --; In Table 1 (crossing columns 13-14); in the ninth table column, n         "in ml./cm.$^2$ min. x $10^{4}$"    should read -- in ml./cm.$^2$/min. x $10^{4}$ --; in the last table column, "Weak membrane", which is bracketed to the data rows of Tests No. 1-5, is applicable only to Test No. 1 --; "Highly viscous solution somewhat difficult to spread." which is bracketed to the data rows of Tests No. 6-10, is applicable only to Test No. 6 --; "Poor reproducibility in the formation of the membrane", which is bracketed to the data rows for Tests Nos. 11-14, is applicable only to Test No. 11 --; "No membrane formed (comparative test)." which is bracketed to the data rows of Test Nos. 15-18, is applicable only to Test No. 15 --; in the sixth table column (under "Acetone)", the entry for Test No. 15, for "c 27" should read -- d 27 --. Column 13, line adjacent printed line number "60", "Table 1 below" should read -- Table 1 above, --. In "Table 2" crossing columns 15-16, in the second column entry at Test No. 30, "PVBTAOHg" should read -- PVBTAOHq --; in the last table column, headed "Remarks" "No membrane formed (comparative test)." which is bracketed to the data rows for Test Nos. 26-29, is applicable only to Test No. 26 and to Test No. 29; "Membrane obtained...of Table 1", which is bracketed to the data rows for Test Nos. 30-33, is applicable only to Test Nos. 30-31 --. In "Table 7" crossing columns 19-20, at the third

UNITED STATES PATENT OFFICE
CERTIFICATE OF CORRECTION

Patent No. 3,737,045            Dated June 5, 1973

Inventor(s) Koichi Hashimoto           Page - 2

It is certified that error appears in the above-identified patent and that said Letters Patent are hereby corrected as shown below:

entry in the row for "Water Permeation rate--", in the table column for the "6" minute immersion, "520 x $10^{-4}$" should read -- 510 x $10^{-4}$ --. Table 9, crossing columns 19-20, at the second entry in the row for the "Water permeation rate" in the table column for the "5" minute rinsing, "420 x $10^{-4}$" should read -- 520 x $10^{-4}$ --. Table 10, patent column 20, under the fourth table column heading "Adhesion...support", in the third row (first Polypropylene occurence), the symbol "$\pm$+" should read -- ++ --; in the last three rows (for cellulose, cellulose acetate, and "Saran") respectively a minus sign (-) should appear.

Signed and sealed this 9th day of July 1974.

(SEAL)
Attest:

McCOY M. GIBSON, JR.
Attesting Officer

C. MARSHALL DANN
Commissioner of Patents